Patented Aug. 8, 1961

2,995,551
ORGANIC NITROGENOUS QUATERNARY PHOSPHORUS COMPOUNDS AND METHOD OF MAKING THE SAME
Martin Reuter, Kronberg (Taunus), Ludwig Orthner and Erhard Wolf, Frankfurt am Main, and Franz Jakob, Hofheim (Taunus), Germany, assignors to Farbwerke Hoechst Aktiengesellschaft vormals Meister Lucius & Brüning, Frankfurt am Main, Germany, a corporation of Germany
No Drawing. Filed Feb. 10, 1959, Ser. No. 792,274
Claims priority, application Germany Feb. 14, 1958
8 Claims. (Cl. 260—249.6)

We have found, as a surprising result, that organic phosphorus compounds can be prepared by reacting tri(hydroxymethyl) phosphine with methylol compounds capable of forming resins, such as obtained in known manner by reaction of, for instance, phenol, cresols, urea, thiourea, ethylene-urea, dicyanodiamide, benzene sulfonamide and para-toluene-sulfonamide with formaldehyde or compounds yielding formaldehyde.

As suitable methylol compounds there may be mentioned, for example, methylol-phenols, for example monomethylol-phenol or trimethylol-phenol, methylol-cresols, furthermore N-methylol compounds, such as N-methylol-p-toluene-sulfonamide, particularly like N-monomethylol-urea and N,N'-dimethylol-urea as well as N,N',N''-trimethylol-melamine and penta-methylol-melamine. Presumably the hydroxy group of the methylol group is fixed to the phosphorus atom, the phosphorus atom being bound to the carbon atom of the methylol group and phosphonium hydroxides being formed.

The process according to the invention is suitably carried out by adding the methylol compounds to tri(hydroxymethyl) phosphine dissolved in water or a low molecular weight alcohol, for instance methanol or ethanol, or, particularly, in a molten state and by further heating to medium temperatures of about 40–120° C., advantageously to 60–90° C., until a clear solution or melt is obtained. It can likewise be operated with smaller amounts of tri(hydroxymethyl) phosphine. During the reaction the pH value of the reaction mixture is increased by about 1–2 units. When 1 mol of an inorganic or organic acid, for instance acetic acid, benzoic acid, phosphoric acid, picrolonic acid, is added to the reaction mixture, the pH value decreases by 2–3 units.

The presumably quaternary organic phosphorus compounds thus obtained are oily, waxy to crystalline substances which are more or less soluble in water and low molecular weight alcohols, and in the form of hydroxides show a weakly basic, in the form of salts show a weakly acid to neutral reaction. They are insoluble in most of the other organic solvents. They often can be characterized as picrolonates.

They are industrially used as pesticides, flame proofing agents for organic fibrous materials, particularly textiles, in the latter case favorably in the presence of aminoplast formers and as intermediate products therefor.

The following examples serve to illustrate the invention but they are not intended to limit it thereto:

Example 1

In the course of about 30 minutes and with exclusion of air 90 grams (1 mol) of monomethylol-urea are introduced, while stirring at about 50° C., into the melt of 124 grams of tri(hydroxymethyl) phosphine (1 mol). The mixture in the form of a thin paste which in water shows a pH value of about 6.5 is heated for one further hour to 110° C., whereby the pH is raised to 8.0. 214 grams of an oil is obtained which in the cold remains clear. The oil is very easily soluble in water, but in methanol only in the heat, when large amounts of solvent are applied. It is insoluble in ether and benzene.

When reacting the oil in an aqueous solution of 50% strength with 1 mol of solid picrolonic acid, a yellow, solid picrolonate is obtained in a good yield which, upon washing with water and alcohol, melts at 192° C. after decomposition. Its analysis corresponds to the formula $C_{15}H_{21}O_9N_6P$, according to which it is presumed that the oil shows the following constitution

Example 2

In the course of about 30 minutes and with exclusion of air 60 grams of dimethylol-urea (0.5 mol) are introduced at about 60° C. into the melt of 124 grams (1 mol) of tri(hydroxymethyl) phosphine. On further heating to 90° C. the paste-like reaction mixture liquefies to an oil which remains clear in the cold, the pH value being increased to 8.1. The oil (180 grams) is very easily soluble in water; it is soluble in cold methanol, even when large amounts are concerned, and likewise in hot ethanol. It is insoluble in ether.

When reacting the oil with 2 mols of picrolonic acid per mol of urea or per 2 atoms of phosphorus a picrolonate is formed in good yield which after recrystallization from a little water melts at 155° C. (after decomposition) and which on elementary analysis corresponds to the formula $C_{29}H_{40}O_{17}N_{10}P_2$. The oil, presumably, shows the following constitution

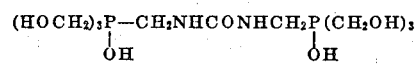

Example 3

43 grams (0.2 mol) of trimethylol-melamine are introduced, with exclusion of air, into the melt of 75 grams (0.6 mol) of tri(hydroxymethyl) phosphine and the mixture which at first constitutes a thin paste, is stirred for a further hour at 70° C., whereby the pH value is increased to 7.8. A clear oil is obtained which solidifies in the cold to a waxlike substance and which is very easily soluble in water and insoluble in organic solvents. Presumably it is the tri[tri(hydroxymethyl)] phosphonium hydroxide of the melamine; the picrolonate melts at 164° C.

When using only 50 grams (0.4 mol) of tri(hydroxymethyl) phosphine and operating in the same manner, a corresponding di-phosphonium compound of the melamine is obtained.

Example 4

206 grams of the sodium salt of trimethylol-phenol (1 mol) are dissolved, with exclusion of air, in 310 grams of water and neutralized while stirring with 60 grams of glacial acetic acid at about 0° C. 248 grams of tri(hydroxymethyl) phosphine (2 mols) are then introduced into the mixture and the clear solution is heated for one further hour to 95° C. The pH value of the solution is thereby increased to 8.5, and the phosphonium compound of the trimethylol-phenol is formed. It can be precipitated from its clear solution in the form of a smear by adding isopropanol and it is obtained after repeated trituration with absolute ethanol and drying under reduced pressure as a solid but very hydroscopic powder. It is insoluble in ethanol and ether and, according to the values of analysis constitutes a mixture of mono[tri(hydroxymethyl)-methylene] phosphonium-hydroxide-dimethylol-phenol and di[tri(hydroxymethyl)-methylene] phosphonium hydroxide monomethylol-phenol.

Instead of 1 mol of the sodium salt of trimethylol-phenol there can be used in the same way likewise 1 mol of 2.5-dimethylol-para-cresol.

Example 5

12.4 grams (0.1 mol) of tri(hydroxymethyl) phosphine are heated to 90–100° C. with exclusion of air and while stirring with 20.1 grams (0.1 mol) of N-methylol-para-toluene-sulfonamide. The reaction is terminated after about 15 minutes which can be observed by the fact that all N-methylol-amide has been dissolved. The colorless viscous oil is still heated for a further 30 minutes to 90–100° C. For purification the reaction product is heated for 5 minutes on the steam bath with 50 cc. of water, the water is decanted off and this operation is repeated again. After drying under reduced pressure the phosphonium compound is obtained which contains per mol of sulfonamide 1 mol of tri(hydroxymethyl) phosphine bound thereto. The compound is a colorless resin which is only sparingly soluble in water, but well soluble in alcohols and acetone.

When instead of 0.1 mol of N-methylol-p-toluene-sulfonamide the equivalent amount of N-methylol-benzene-sulfonamide is used, the analogous benzene compounds are obtained.

Example 6

95 grams (¼ mol) of the oily reaction product obtained according to Example 2 from 1 mol of tri(hydroxymethyl) phosphine and ½ mol of dimethylol-urea in 95 grams of water and 30 grams (0.5 mol) of glacial acetic acid are added while stirring and cooling, whereby the pH value of 8.1 is reduced to 4.8. By evaporation under reduced pressure the acetate is obtained from the clear solution in the form of a waxlike residue in a yield of 105 grams. The product is insoluble in lower alcohols and ether.

We claim:

1. The process for making water soluble organic nitrogenous quaternary phosphorus compounds which comprises contacting tri(hydroxymethyl) phosphine at a temperature of 40° to 120° C. with a monomeric N-methylol compound having 2 to 6 trivalent nitrogen atoms and 1 to 5 methylol groups bound to said nitrogen atoms, said N-methylol compound being selected from the group consisting of N-methylol ureas, N-methylol ethylene ureas, and N-methylol melamines.

2. A process as claimed in claim 1, wherein the reaction is carried out by dissolving tri(hydroxymethyl) phosphine in a solvent selected from the group consisting of water and a lower alkanol, adding said N-methylol compound, and heating the mixture to a temperature of 40–120° C.

3. A process as claimed in claim 1, wherein the reaction is carried out by melting the tri(hydroxymethyl) phosphine, adding said N-methylol compound and heating the mixture to a temperature of 40–120° C.

4. A process as claimed in claim 1, wherein the reaction is carried out at a temperature of 60–90° C.

5. The process as in claim 1 wherein said N-methylol compound is monomethylol urea.

6. The process as in claim 1 wherein said N-methylol compound is dimethylol urea.

7. The process as in claim 1 wherein said N-methylol compound is trimethylol melamine.

8. A water soluble nitrogenous quaternary phosphorus compound obtained by contacting tri(hydroxymethyl) phosphine at a temperature of 40° to 120° C. with a monomeric N-methylol compound having 2 to 6 trivalent nitrogen atoms and 1 to 5 methylol groups bound to said nitrogen atoms, said N-methylol compound being selected from the group consisting of N-methylol ureas, N-methylol ethylene ureas, and N-methylol melamines.

References Cited in the file of this patent

UNITED STATES PATENTS

| | | |
|---|---|---|
| 2,544,706 | Molowan | Mar. 21, 1951 |
| 2,809,941 | Reeves et al. | Oct. 15, 1957 |